United States Patent [19]

Nakamori et al.

[11] Patent Number: 4,694,363
[45] Date of Patent: Sep. 15, 1987

[54] MAGNETIC DISC COUPLING MECHANISM FOR DISC DRIVE UNIT

[75] Inventors: Masao Nakamori, Kawaguchi; Harunobu Ichinose, Tokyo, both of Japan

[73] Assignee: Copal Company Limited, Japan

[21] Appl. No.: 795,770

[22] Filed: Nov. 7, 1985

[30] Foreign Application Priority Data

Nov. 12, 1984 [JP]  Japan ................ 59-238063

[51] Int. Cl.$^4$ ............................................. G11B 17/04
[52] U.S. Cl. ......................................... 360/99; 360/97
[58] Field of Search .................................. 360/97–99, 360/133, 86, 137; 369/270–271

[56]  References Cited

U.S. PATENT DOCUMENTS 4,445,157  4/1984  Takahashi ........................... 360/133
4,562,498  12/1985  Shibata ................................. 360/97

FOREIGN PATENT DOCUMENTS 59-135550  9/1984  Japan .
0218680  12/1984  Japan ..................................... 260/97
0038756  2/1985  Japan ..................................... 360/97
2138197  10/1984  United Kingdom .................. 360/99

Primary Examiner—Stuart N. Hecker
Assistant Examiner—David J. Severin
Attorney, Agent, or Firm—Parkhurst & Oliff

[57] ABSTRACT

A magnetic disc mounting mechanism for use in a disc drive unit adapted to drive a magnetic disc while magnetically attracting and holding the disc on a spindle shaft. The coupling mechanism includes a forcible pressing member for forcibly fitting a center core of the disc onto the spindle shaft and a member which is adapted to release the pressing of the forcible pressing member while operating an ejecting mechanism. This member operates to release, after the forcible pressing member has pressed the center core of the disc onto the spindle shaft such as to couple the disc to the spindle shaft, the pressing force exerted by the pressing member so that the load of the spindle motor during driving the disc is reduced advantageously.

8 Claims, 4 Drawing Figures

MAGNETIC DISC COUPLING MECHANISM FOR DISC DRIVE UNIT

BACKGROUND OF THE INVENTION

The present invention relates to a magnetic disc coupling mechanism for use in disc drive units and, more particularly, to a magnetic disc coupling mechanism suitable for use in a small-sized disc drive unit for driving a small magnetic disc of 2 inches or so in size which is used, for example, in an electronic still camera, the coupling mechanism being of the type in which the center core of the magnetic disc is held on a spindle hub by magnetic force of a permanent magnet such as to be driven by the spindle hub.

FIGS. 3 and 4 show a known magnetic disc coupling mechanism incorporating a permanent magnet for holding the magnetic recording medium. Referring to these Figures, a disc drive unit has a housing 20 adapted to receive a disc cassette 22 having a hard case. The arrangement is such that the disc cassette 22 is manually forced into the housing 20 and then the housing 20 is depressed towards a spindle hub which will be explained later, so that the magnetic disc 21 in the disc cassette is located and held on the spindle hub and coupled to the same. More specifically, when the disc cassette accommodating the disc 21 is received in the housing 20, a magnetic portion 25a constituting a lower portion of the center core 25 of the magnetic disc 21 opposes a ring-shaped permanent magnet 24 provided on an upper portion of the spindle hub 23 which is drivingly connected to a spindle motor. A roller 27 which is biased downwardly by a spring 26 is disposed on the portion of the housing 20 above the center core 25 of the disc 21.

As the housing 20 is depressed, the center core 25 is pressed by the roller 27 as shown in FIG. 4 so that a hole 25b of the center core 25 is forced to fit on the spindle shaft 23a serving as the output shaft of the spindle motor, with the center core 25 attracted and held magnetically by the permanent magnet 24.

This known arrangement, however, suffers a problem in that the load torque on the spindle motor is increased by an amount corresponding to the load imposed by the roller 27 including the biasing force of the spring 26, because the center core 25 is continuously pressed by the roller 27 under the biasing force of the spring 26 during rotation of the spindle hub 23.

The center core of the magnetic disc is forcibly fitted to the spindle shaft by a forcible coupling means including the roller. This known arrangement, therefore, requires a suitable arrangement for moving this forcible coupling means away from the center core after the coupling operation. An example of such an arrangement is shown in Japanese Utility Model Laid-Open No. 135550/1984. This arrangement employs a complicated mechanism incorporating a rotary cam and, therefore, inevitably increases the size of the disc drive unit and complicates the construction of the same. This makes it difficult to obtain a compact and light-weight disc drive unit suitable for use in a portable electronic still camera. Namely, the use of such a large-sized and heavy-weight disc drive unit undesirably increases the size and weight of the camera.

SUMMARY OF THE INVENTION

Accordingly, an object of the invention is to provide a magnetic disc coupling mechanism in which the disc is relieved from the load of the forcible coupling means once it is forcibly coupled to the spindle shaft so that the load torque applied to the spindle motor is reduced advantageously.

Another object of the invention is to provide a magnetic disc coupling mechanism which is improved to eliminate any load applied to the disc during rotation, thereby assuring a highly accurate rotation of the disc with a small driving torque.

Still another object of the invention is to provide a magnetic disc coupling mechanism having a simple, small-sized and light-weight forcible coupling mechanism which forcibly couples the disc onto the spindle shaft and, after the coupling, moves away from the center core of the disc.

To these ends, according to the invention, there is provided a magnetic disc coupling mechanism for use in a disc drive unit for driving a flexible magnetic disc rotatably accommodated by a disc cassette and having a center core exposed through a window formed in a wall of the disc cassette, the center core being provided with a hole for forcibly fitting around a spindle shaft and also with a magnetic member, the magnetic disc coupling mechanism comprising: a spindle means adapted for rotatively driving the magnetic disc and including the spindle shaft for forcibly fitting in the hole in the center core of the magnetic disc, and a permanent magnet for attracting the magnetic member of the center core; a housing for accommodating the disc cassette and movable towards and away from the spindle means, the housing being biased by a spring away from the spindle means; a locking member for locking the housing at a drive position where the housing approaches the spindle means; and a forcible pressing member adapted to press the center core of the magnetic disc in the disc cassette accommodated by the housing, the forcible pressing member being biased by a spring in such a direction as to press the center core towards the spindle member; wherein the forcible pressing member presses the center core of the magnetic disc such that the spindle shaft is forcibly fitted in the hole in the center core in the final region of the stroking of the housing to the drive position and, thereafter, the locking member causes the forcible pressing member to be moved away from the center core during locking of the housing in the drive position.

These and other objects, features and advantages of the invention will become clear from the following description of the preferred embodiment when the same is read in conjunction with the accompanying drawings.

DESCRIPTION OF THE PREFERRED EMBODIMENT

Figure 1:
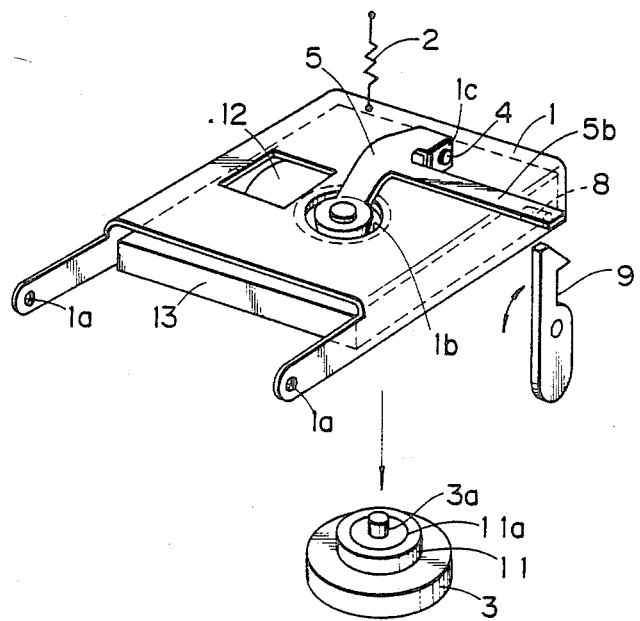
FIG. 1 is a partly exploded perspective view of an essential portion of a magnetic disc coupling mechanism embodying the present invention.
Figure 2:
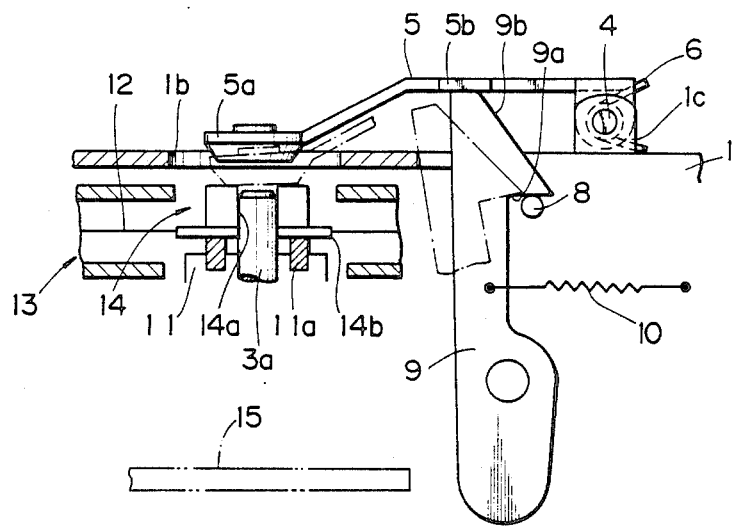
FIG. 2 is a sectional view of an essential portion of the magnetic disc coupling mechanism of the invention in the state after forcible coupling of the magnetic disc.
Figure 3:
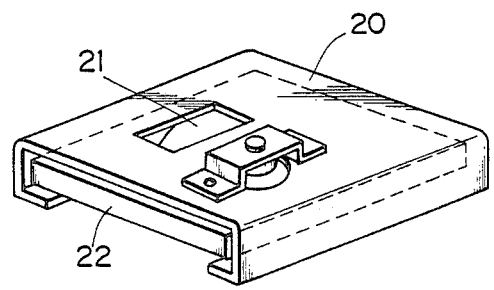
FIG. 3 is a perspective view of an essential portion of a conventional magnetic disc mounting mechanism.
Figure 4:
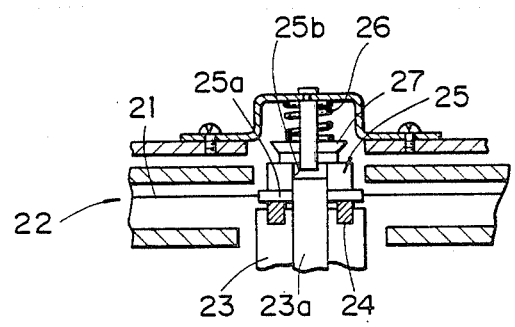
FIG. 4 is a sectional view of an essential portion of the magnetic disc coupling mechanism shown in FIG. 3.

FIGS. 1 and 2 show a magnetic disc coupling mechanism of the invention for use in a disc drive unit. A housing 1 is adapted to be swung about one end thereof and is upwardly biased at its other end by a spring 2. The housing 1 is adapted to accommodate and hold a disc cassette which is shown only schematically, and is provided in the lower side thereof with an opening which is shaped and sized to face at least a spindle motor 3. The housing 1 is also provided with a hole 1b formed in the upper side thereof at a position corresponding to the spindle motor 3 disposed under the housing 1, as well as a projection formed on the upper side thereof at a position spaced from the hole 1b. In addition, a pin 8 is provided on one side surface of the housing 1.

A forcible pressing member 5 is pivotally connected at its rear end to the projection 1c by means of the shaft 4 such as to swing up and down. A spring 6 acting between the forcible pressing member 5 and the housing 1 is adapted to urge the forcible pressing member 5 such that the pressing portion 5a on the front end of the forcible pressing member is positioned within the hole 1b formed in the housing 1.

An arm 5b is formed on one side surface of the forcible pressing member such as to project to one side of the housing 1. A locking lever 9 protrudes from the one side of the housing 1 such as to be swingable back and forth as indicated by arrows in the drawings about the lower end thereof, and is urged rearwardly by the force of the spring 10. A locking portion 9a formed in the rear side of the upper end of the locking lever 9 is engageable with the pin 8 projected from the side surface of the housing 1.

A spindle hub 11 is fixed to the spindle shaft 3a of the spindle motor 3 for rotation as a unit therewith. A ring-shaped permanent magnet 11a is provided on the spindle hub 11.

In operation, a disc cassette 13 accommodating a magnetic disc 12 is inserted into the housing 1 and then the housing 1 is depressed such as to swing downwardly about one end 1a thereof against the force of the spring 2. In consequence, the forcible pressing member 5, which is secured to the projection 1c on the upper side of the housing 1 and urged downwardly by the spring 6 is moved downwardly together with the spring 6.

Since the end pressing portion 5a of the forcible pressing member 5 is positioned within the hole 1b in the housing 1, the pressing portion 5a contacts with the upper surface of the center core 14 of the magnetic disc 12 thereby pressing the magnetic disc 12 downwardly as the housing 1 moves downwardly. In consequence, the spindle shaft 3a is forcibly pressed into the hole 14a in the center core 14.

The pin 8 mentioned before is held in contact with a tapered portion 9b of the locking lever 9 during the lowering of the housing 1 such as to rotate the locking lever 9 counter-clockwise as viewed in FIG. 2 overcoming the force of the spring 10. When the pin 8 reaches the lower end of the tapered portion 9b of the locking lever 9, the latter is freed from the pin 8 and is rotated clockwise by the force of the spring 10. Thereafter, the housing 1 is held in the state in which the locking portion 9a of the locking lever 9 is engagement with the pin 8.

The force of the spring 10 acting on the locking lever 9 is greater than the force of the spring 6 which depresses the forcible pressing member 5, and the arm 5b provided on the forcible pressing member 5 is positioned to oppose the locking lever 9. Therefore, when the locking lever 9 is rotated clockwise after the arrival of the pin 8 at the locking portion 9a of the locking lever 9, the locking lever 9 urges the arm 5a of the forcible pressing member 5 upwardly.

Thus, the forcible pressing member 5 is rotated upwardly from the position shown by one-dot-and-dash line to the position of solid line in FIG. 2, whereby the pressing force exerted by the pressing portion 5a on the center core 14 is dismissed to allow the magnetic disc to be held in the state shown in FIG. 2.

In this case, since the lower portion 14b of the center core 14 is made of a magnetic material, the center core 14 is magnetically attracted and fixed by the permanent magnet 11a of the spindle hub 11 provided on the spindle shaft 3a of the spindle motor 3.

The magnetic disc is thus set in the drive position. In operation, a magnetic head of the disc drive unit contacts the magnetic disc 12 through a head window formed in a wall of the disc cassette 13, thus performing reading and writing of information.

The magnetic disc 12 in the disc cassette 13 is rotated by the spindle motor 3 during the writing and reading. According to the invention, the end pressing portion 5a of the forcible pressing member 5 is spaced apart from the center core 14 of the magnetic disc 12 during the operation of the spindle motor 3, so that the load torque imposed on the spindle motor 3 is remarkably reduced. This means that a motor having a smaller capacity can be used satisfactorily in the disc drive unit which incorporates the magnetic disc coupling device of the invention.

For taking the disc cassette 13 out of the housing 1 after completion of writing or reading, the user simply depresses an eject lever 15 which is adapted to be projected in response to the depression of the housing 1 as known per se. As a result, the eject lever 15 is moved to the right as viewed in FIG. 2, thus rotating the locking lever 9 counter-clockwise against the biasing force of the spring 10. In consequence, the locking lever 9 releases the pin 8 so that the housing 1 is pulled upward by the force of the spring 2, thereby permitting the disc cassette 13 to be pulled out from the housing 1.

Although the invention has been described through specific terms, it is to be noted that the described embodiment is only illustrative and various changes and modifications may be imparted thereto without departing from the scope of the invention which is limited solely by the appended claims.

What is claimed is

1. A magnetic disc coupling mechanism for use in a disc drive unit for driving a flexible magnetic disc rotatably accommodated by a disc cassette and having a center core exposed through a window formed in a wall of said disc cassette, said center core being provided with a hole for forcibly fitting around a spindle shaft and also with a magnetic member, said magnetic disc coupling mechanism comprising:
    (a) a spindle means adapted for rotatively driving said magnetic disc and including said spindle shaft for forcibly fitting in said hole in said center core of said magnetic disc, and a permanent magnet for attracting said magnetic member of said center core;

(b) a housing for accommodating said disc cassette and movable towards and away from said spindle means, said housing being biased by a first spring away from said spindle means;

(c) a locking member for locking said housing at a drive position where said housing is near said spindle means; and (d) a forcible pressing member adapted to press said center core of said magnetic disc in said disc cassette accommodated by said housing, said forcible pressing member being biased by a second spring in such a direction as to press said center core towards said spindle member;

wherein said forcible pressing member presses said center core of said magnetic disc such that said spindle shaft is forcibly fitted in said hole in said center core in the final region of the stroking of said housing to said drive position and, thereafter, said locking member causes said forcible pressing member to be moved away from said center core during locking of said housing in said drive position.

2. A magnetic disc coupling mechanism according to claim 1, wherein said forcible pressing member is secured to the upper side of said housing for a limited vertical swinging motion and includes a pressing portion for pressing said center core and an arm engageable with said locking member.

3. A magnetic disc coupling mechanism according to claim 1, wherein said housing is swingably supported at its one end to said disc drive unit such that the other end thereof is movable up and down by a predetermined amount.

4. A magnetic disc coupling mechanism according to claim 1, wherein said locking member is swingably held by the body of said disc drive unit and rotationally biased in one direction by a third spring and is provided with a hooked head having a tapered portion engageable with a pin provided on said housing, said locking member being movable through sliding engagement between said tapered portion of said hooked head and said pin overcoming the force of said third spring and adapted to lock said housing through engagement between a stepped portion connected to said tapered portion and said pin, said locking member being adapted to rotate such as to move said forcible pressing member upward when said stepped portion is brought into engagement with said pin.

5. A magnetic disc coupling mechanism according to claim 4, wherein said locking member and said pin are adapted to be disengaged from each other by a forward movement of an eject lever mounted on said disc drive unit for rotating said locking member.

6. A magnetic disc coupling mechanism for use in a disc drive unit for driving a flexible magnetic disc rotatably accommodated by a disc cassette and having a center core exposed through a window formed in a wall of said disc cassette, said center core being provided with a hole for forcibly fitting around a spindle shaft and also with a magnetic member, said magnetic disc coupling mechanism comprising:

(a) a spindle means adapted for rotatively driving said magnetic disc and including said spindle shaft for forcibly fitting in said hole in said center core of said magnetic disc, and a spindle hub integrally fixed to said spindle shaft and provided on the upper side thereof with a permanent magnet for attracting said magnetic member of said center core;

(b) a housing for accommodating said disc cassette and movable towards and away from said spindle means and swingably supported at its one end by said disc drive unit such that the other end thereof is movable up and down by a predetermined amount, said housing being biased by a first spring away from said spindle means;

(c) a locking member for locking said housing at a drive position where said housing is near said spindle means, said locking member being rotationally biased in one direction by a second spring and being provided with a hooked head having a tapered portion engageable with a pin provided on said housing, said locking member being movable through sliding engagement between said tapered portion of said hooked head and said pin overcoming the force of said second spring and adapted to lock said housing through engagement between a stepped portion connected to said tapered portion and said pin; and (d) a forcible pressing member adapted to press said center core of said magnetic disc in said disc cassette accommodated by said housing, said forcible pressing member being swingably supported at its rear end on the upper side of said housing for rotation up and down by a predetermined amount and being provided at its other end with a pressing portion for pressing said center core and on one side thereof with an arm, said forcible pressing member being biased by a third spring such that said pressing portion presses said center core towards said spindle member, said arm being adapted to be brought into engagement with said locking member before said housing reaches said drive position;

wherein said forcible pressing member presses said center core of said magnetic disc such that said spindle shaft is forcibly fitted in said hole in said center core in the final region of the stroking of said housing to said drive position, thereby allowing said permanent magnet on said spindle hub to attract said magnetic member on said center core and, thereafter, said lock member is moved by the force of said second spring such as to cause said forcible pressing member to be moved away from said center core during locking of said housing in said drive position.

7. A magnetic disc mounting mechanism according to claim 6, wherein the biasing force of said third spring for pressing said pressing portion of said forcible pressing member onto said center core is smaller than the biasing force of said second spring for rotationally biasing said locking member.

8. A magnetic disc coupling mechanism according to claim 6, wherein said locking member and said pin are disengageable by forward movement of an eject lever which drives said locking member overcoming the force of said second spring.

* * * * *